United States Patent [19]

Goddard

[11] Patent Number: 4,994,922
[45] Date of Patent: Feb. 19, 1991

[54] IMAGE STORAGE AND RETRIEVAL APPARATUS

[75] Inventor: Larry D. Goddard, Decatur, Ga.

[73] Assignee: Goddard Technology Corporation, Atlanta, Ga.

[21] Appl. No.: 339,061

[22] Filed: Apr. 17, 1989

Related U.S. Application Data

[63] Continuation of Ser. No. 68,268, Jun. 30, 1987, Pat. No. 4,823,196.

[51] Int. Cl.$^5$ ............................................. H04N 5/782
[52] U.S. Cl. .................................... 358/310; 360/35.1
[58] Field of Search .............. 358/310, 320, 335, 342; 360/19.1, 33.1, 32, 22, 35.1

[56] References Cited

U.S. PATENT DOCUMENTS

| | | | |
|---|---|---|---|
| 4,646,165 | 2/1987 | Hirota | 358/310 |
| 4,757,391 | 7/1988 | Hirota et al. | 358/320 |
| 4,772,962 | 9/1988 | Tanaka | 360/35.1 |
| 4,779,145 | 10/1988 | Lemelson | 360/2 |
| 4,825,290 | 4/1989 | Iida et al. | 358/209 |

Primary Examiner—L. T. Hix
Assistant Examiner—D. Rutledge
Attorney, Agent, or Firm—Bailey & Hardaway

[57] ABSTRACT

There is disclosed a still image storage and retrieval apparatus that is capable of storing and retrieving a large number of images from a magnetic disk storage medium. The apparatus uses a color under recording format, and the disk speed is synchronized to the video sync signal. The recording and playback signals are time base compensated to offset the effects of jitter in the disk speed by using reference frequencies from the disk drive to down-convert and up-convert the color signal. In another embodiment a reference signal from the disk is used to modulate the color signals. In another embodiment a digital "walk along" memory stores time base error information during recording for time base error correction during playback. A one image memory is also provided to allow for transition between images during playback.

1 Claim, 10 Drawing Sheets

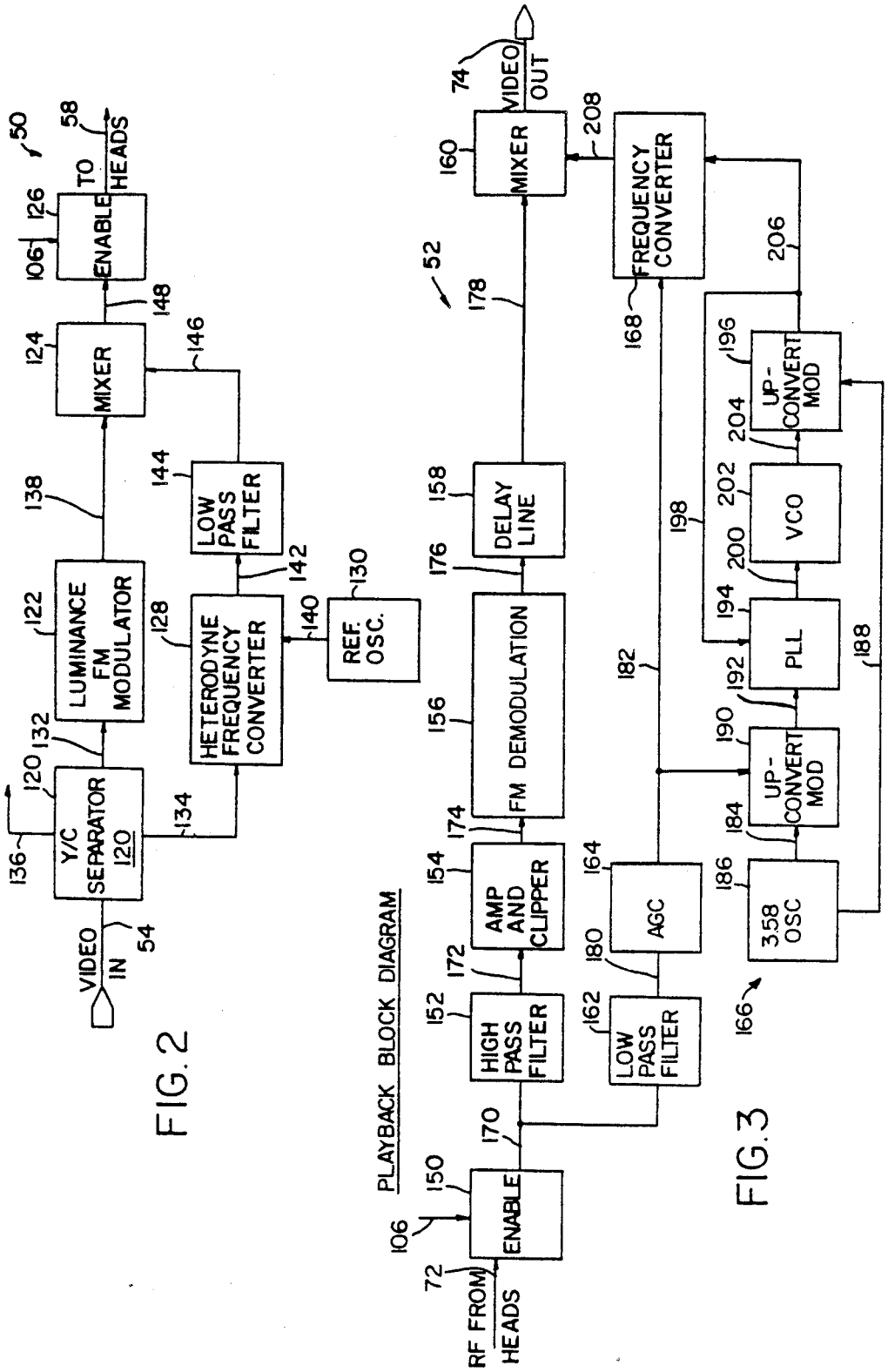

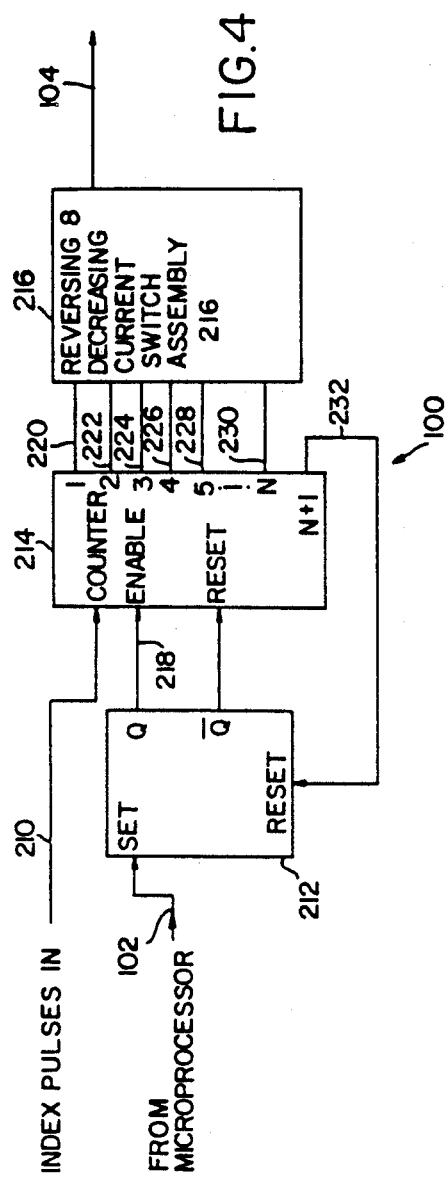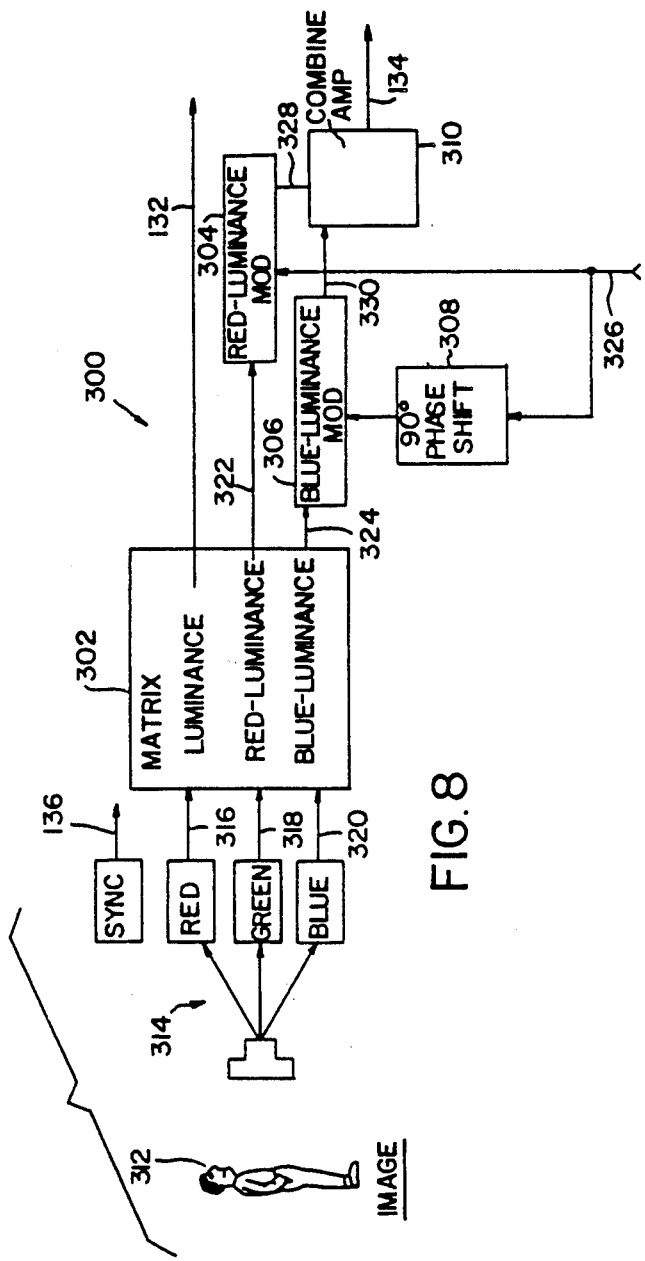

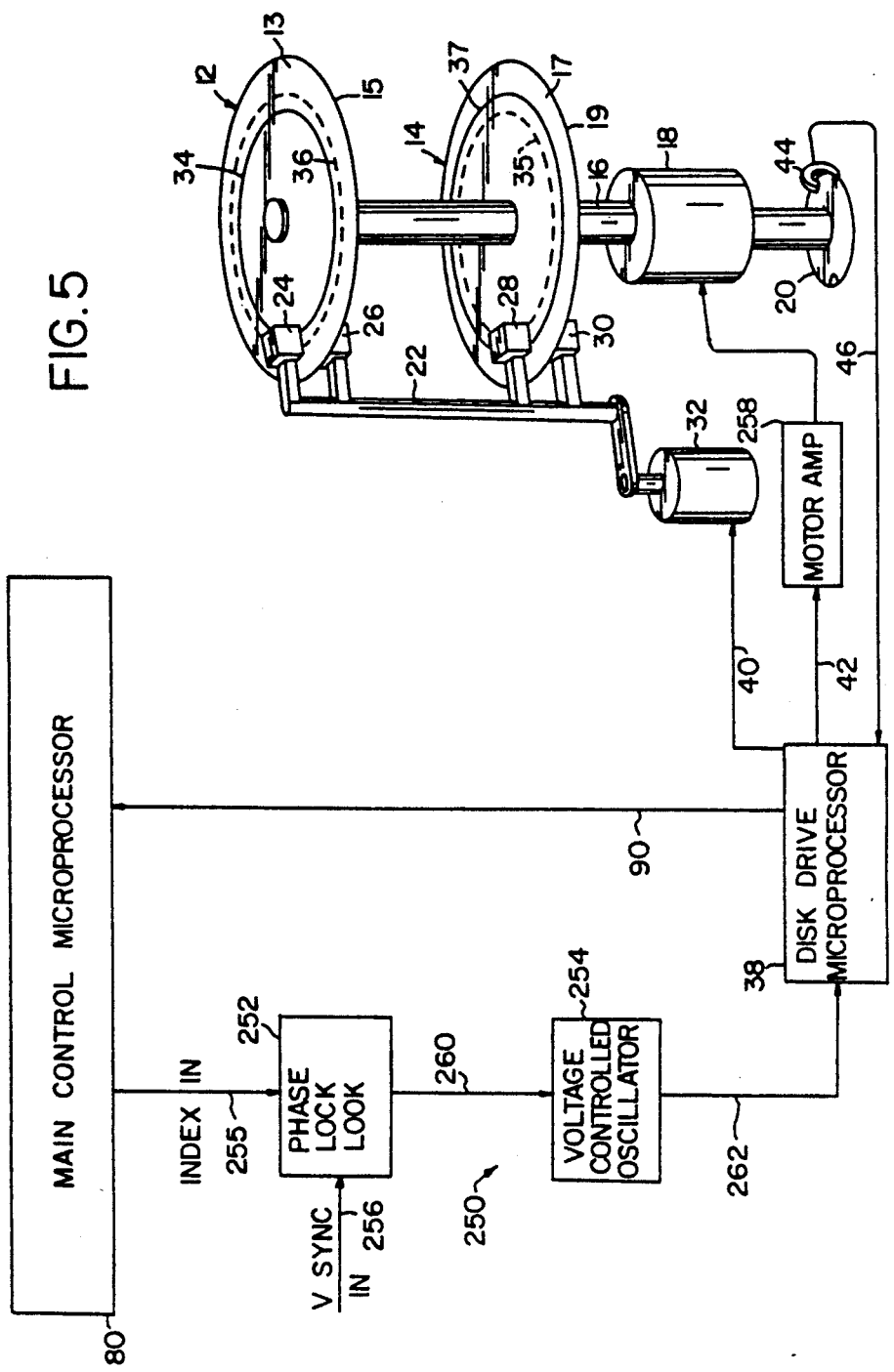

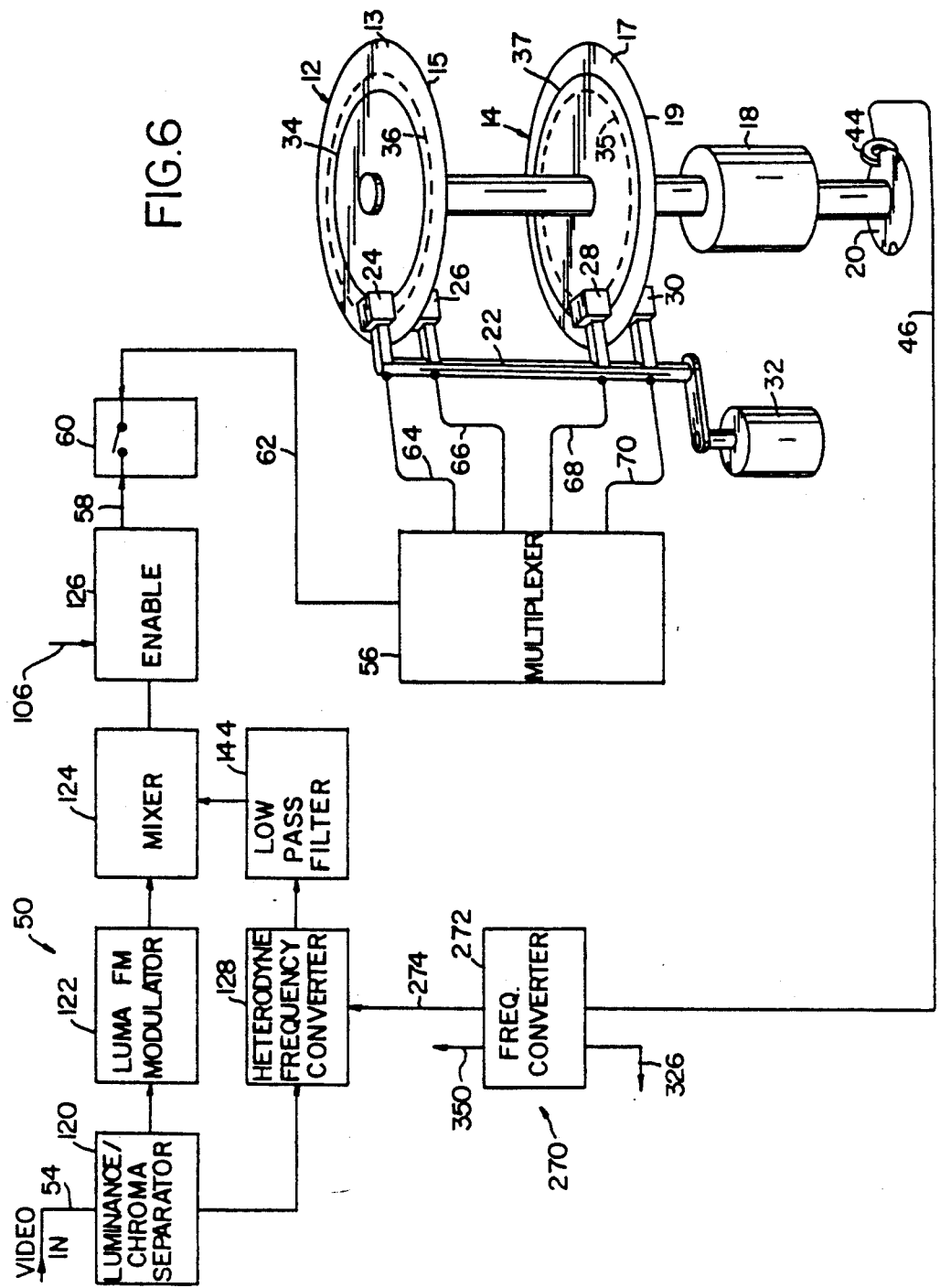

IMAGE STORAGE AND RETRIEVAL APPARATUS

This application is a continuation of application Ser. No. 068,268, filed Jun. 30, 1987, now U.S. Pat No. 4,823,196.

BACKGROUND OF THE INVENTION

This invention relates generally to an image storage and retrieval apparatus and more particularly relates to an apparatus for storing more than 2000 still color video images on a storage medium, such as a magnetic disk, and retrieving the images for display and processing.

Current digital recording with its attendant cost has prevented high density storage of still color video images and high speed random access with erasability. The problem with storage of color images in digital form is the tremendous amount of storage capacity required, typically 500+ kilobytes of storage per image. Optical discs, while providing high density storage, are not erasable at reasonable costs.

In video recording, the luminance and color components of a video signal are either recorded together on a single magnetic track or are recorded separately on two or more tracks. Predictably, there are advantages and drawbacks to each approach. Single track recording requires less recording media space and thereby increases the number of images that can be placed on a given magnetic media. Recording the video signal components on two or more tracks usually improves the image quality, but severely complicates the apparatus and reduces the storage capacity of a given media by one half or more.

Early video disk recorders for replays were pioneered by Ampex and others in the 1960's and used both rigid and floppy disk magnetic media for storage of images. These systems typically used a narrow band FM recording of the modulated analog signal and stored a single video frame with each rotation of the disk. Although providing the user with some excellent advantages, such as a high image storage density and quick access times, these units were sufficiently expensive to limit their use to high priced systems in broadcasting and medical imaging. Further, these early units were limited by the irregularities in and on the surface of the recording media. This led researchers at that time to discover that frequency modulation, versus amplitude modulation, was a more effective way to encode the video signal. These systems also required a high head-to-media relative velocity of 1,000 to 2,000 inches per second, due to head gap lengths, short video wave lengths required, and high signal-to-noise requirements. In the floppy disk versions of these systems where the heads were in constant contact with the media, the useful life was limited, usually less than 1,000 hours. In the rigid disk versions, useful life might approach 2,500 hours—prolonged by the air space between the heads and media, but limited due to manufacturing imperfections, wear from occasional head-to-media contact, and other factors.

Image storage technology today is characterized by the movement from film and slides to videotape and video disk to digitized images in digital mass storage. This recent technology has taken two directions: the first is a trend toward digital video disk or CD-ROM (Compact Disk-Read Only Memory); the second, a trend toward WORM (Write Once, Read Many) storage. Both of these technologies have significant drawbacks in that they are not erasable and suffer from high media storage capacity requirements. The market today has seen the introduction of lower cost, high quality digitized storage of images. However, the problem as previously noted with storage of color images in digital form is that it takes a tremendous amount of information storage capacity, typically 500+ kilobytes of storage per image.

The need for a compact, inexpensive, totally self-contained image recorder, storage unit, playback and monitoring device for storing large numbers of high quality still color images is apparent in several fields: security and surveillance, entry access systems, computer peripherals, training devices, and picture archiving systems, and as a replacement for color slide projectors, to name only a few.

SUMMARY OF THE INVENTION

It is therefore an object of the present invention to provide an image storage and retrieval apparatus capable of storing a large number of high quality still color images and retrieving those images rapidly for display and further processing.

It is further an object of the present invention to provide means for correcting anomalies in the time base of the video signals which anomalies result from storage and/or retrieval of the still color images.

It is likewise an object of the present invention to provide an image storage and retrieval apparatus having an auxiliary memory for storing corresponding data such as time of day, date, camera lens information, time base error information, etc., corresponding to each of the stored still color images.

It is also an object of the present invention to provide means for holding a first image retrieved from the storage medium during the subsequent retrieval of a second image from the storage medium so that the two images may be dissolved, blended, overlaid, or compared in other fashions.

It is likewise an object of the present invention to provide an image storage and retrieval apparatus in which the storage medium is erasable so that images may be stored or replaced by other images as desired.

In order to attain the foregoing objectives, the image storage and retrieval apparatus stores and retrieves a number of still images from a storage medium. The apparatus comprises a storage medium, preferably a high speed magnetic hard disk, a servo-controlled motor for rotating the disk at a preselected speed, read/write heads and circuitry for selectively positioning the read/write heads to select any one of a number of circular tracks on the storage disk. A record circuit processes a conventional composite video signal and produces an analog signal which is connected directly to the read/write head and recorded on one track of the storage disk. A playback circuit retrieves the analog signal from one of the selected tracks of the video disk via the read/write head and reconstitutes the composite video signal. Control means, a microprocessor, responds to external instructions, such as a keyboard, a computer port input, or similar control input, selects the particular circular track on the storage disk, and selects the storage mode or retrieval mode for the apparatus.

The record circuit of the present invention separates a conventional composite video signal into its luminance and chroma components, down-converts the chroma component by a reference frequency, preferably about 4 MHz, frequency modulates the luminance component, recombines the modulated luminance and down-converted chroma components to produce an analog signal for storage on the disk via one of the read/write heads. The playback circuit upon receiving the analog signal from the read/write head separates the luminance and chroma components, demodulates and delays the luminance component, up-converts the chroma component back to its original frequency in a conventional video signal and subsequently recombines the components to recover the composite video signal for display on a standard video monitor.

In order to assure clean re-recording of substitute images, an erase circuit is provided which may be either a high frequency oscillator or a decreasing reversing d.c. current switch. The microprocessor for the apparatus upon receiving a command to record an image, first initiates an erase sequence which, in one embodiment, connects the high frequency oscillator to the read/write head to record the erase frequency for a predetermined time. In another embodiment, the microprocessor connects a decreasing reverse d.c. current switch to the read/write head so that each pass of the read/write head over the circular track has a decreasing current density. Consequently, the track is totally degaussed prior to recording the next still color image on the particularly selected circular track.

The image storage and retrieval apparatus of the present invention assures high quality image storage and retrieval by compensating for jitter that inevitably occurs in the speed of the spinning storage disk. In one aspect of the invention, an encoder connected to the spindle of the storage disk produces a rotation signal which, during the storage mode, is constantly compared in a phase lock loop to the video sync signal from the incoming composite video signal in order to control the servo-motor which drives the storage disk. In another aspect of the present invention, the output of the encoder produces the reference frequency which is used to both down-convert the chroma signal in the record circuit and up-convert the chroma signal in the playback circuit. In another aspect of the present invention, the encoder produces a reference signal which is used in a signal processor to modulate the primary red, green, and blue signals prior to producing the conventional composite video signal with the luminance and chroma components.

In another aspect of the present invention, an auxiliary addressable digital memory is provided which has a number of data banks each corresponding to a single recording track on the storage disk and a number of words within each bank. The auxiliary memory is addressed by the microprocessor simultaneously with addressing the storage disk, and the encoder produces a word count within each memory bank so that as the storage disk spins, the digital memory under control of the encoder steps along with the storage disk. Therefore, corresponding data can be stored in the auxiliary memory, and upon retrieval of the still image from the storage disk, the auxiliary memory, stepping along with the storage disk, can output the auxiliary information to a display or to be used for further control.

Also, in accordance with the same auxiliary memory, the information stored can be information relating to the jitter experienced by the storage disk during the storage mode. Upon retrieval, that stored error information can be retrieved and used to compensate the recovered analog signal and remove the effects of the time base errors that occur during storage and retrieval.

In another aspect of the present invention, a digital frame memory is provided to hold a single frame or image while the next image is retrieved from the storage disk so that the two images can be mixed with each other to produce special effects such as dissolving, overlaying, blending, or the like.

Other objects and advantages of the present invention will become apparent upon reading the following detailed description and upon reference to the drawings.

BRIEF DESCRIPTION OF THE DRAWINGS

FIG. 2 is a block diagram of the record circuit of the present invention;

FIG. 3 is a block diagram of the playback circuit of the present invention;

FIG. 4 is a block diagram of the erase circuit of the present invention;

FIG. 5 is a block diagram of the servo-control circuit of the present invention;

FIG. 6 is a block diagram showing one means of time base compensation during the storage mode;

FIG. 8 is a block diagram showing another means of time base compensation during the storage mode;

DETAILED DESCRIPTION OF THE INVENTION

While the invention will be described in connection with preferred embodiment, it will be understood that I do not intend to limit the invention to that embodiment. On the contrary, I intend to cover all alternatives, modifications, and equivalents as may be included within the spirit and scope of the invention as defined by the appended claims.

Figure 1:
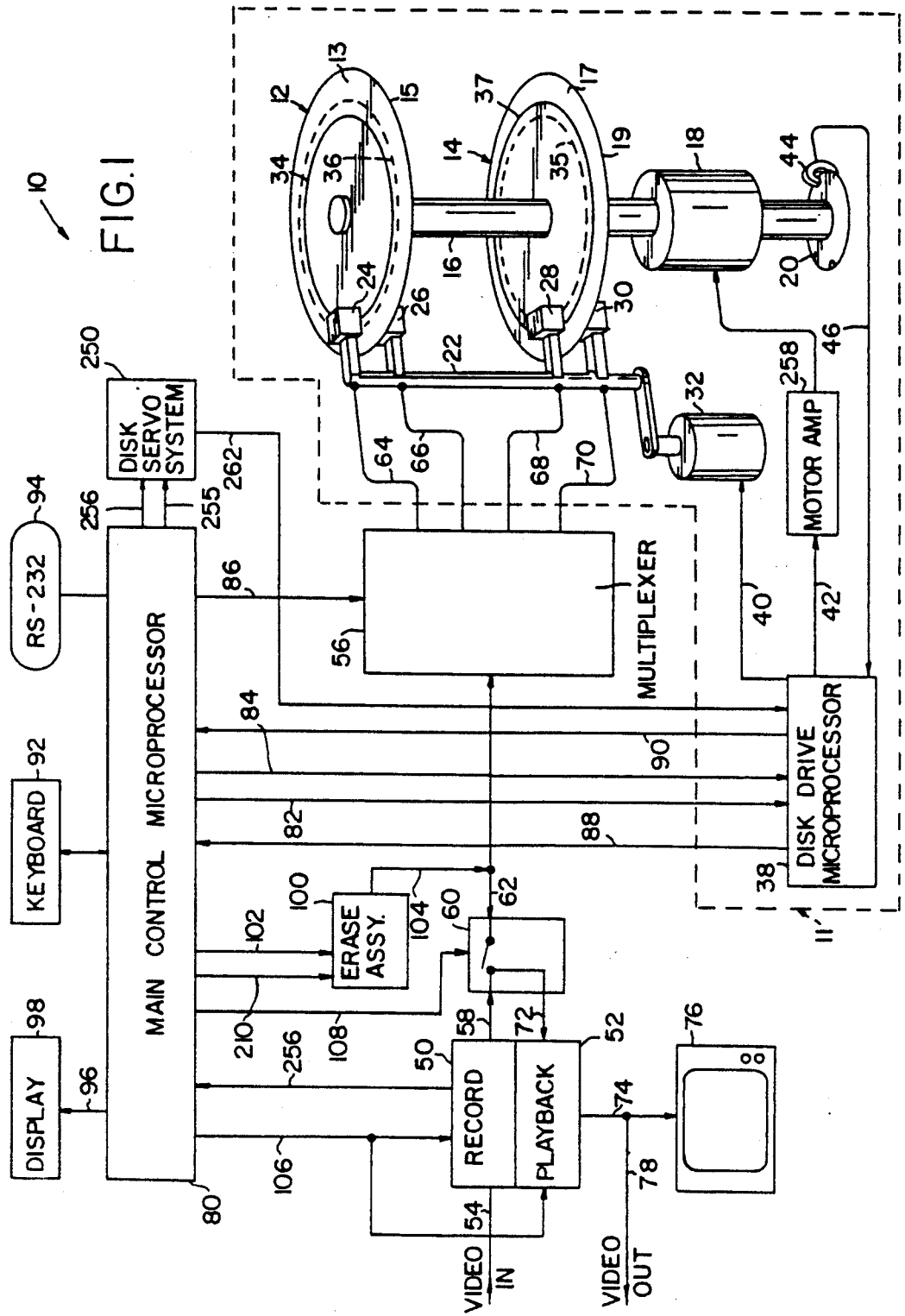
FIG. 1 is a block diagram showing the image storage and retrieval apparatus of the present invention.

Turning to FIG. 1, there is shown the image storage and retrieval apparatus 10 of the present invention. The apparatus includes a main storage medium or disk drive 11. The storage medium includes a set of magnetic disks 12 and 14 mounted on a spindle 16 which spindle is rotated by a servo-controlled motor 18 at a preselected speed. An encoder 20 is also attached to and rotates with the spindle 16. The storage medium 11 also includes a read/write head assembly 22 which includes a read/write head 24 that is mounted adjacent to the top surface 13 of the disk 12, a read/write head 26 which is mounted adjacent to the bottom surface 15 of the disk 12, a read write head 28 which is mounted adjacent to the top surface 17 of the disk 14, and a read/write head 30 which is mounted adjacent to the bottom surface 19 of the disk 14. The read/write head assembly 22 simultaneously moves the heads 24, 26, 28, and 30 radially across the disks 12 and 14 under control of a head drive means 32.

The disks 12 and 14 are divided into a number of concentric tracks on each of the four surfaces, such as tracks 34 and 36 on the top surface 13 of disk 12 and radially aligned corresponding tracks 35 and 37 on the top surface 17 of disk 14. The tracks 34 and 35 together (along with two similar radially aligned tracks on the bottom surfaces 15 and 19 of disks 12 and 14) define an imaginary cylinder. In order to record (write) information onto the tracks 34 and 35 in the storage mode or to sense (read) information recorded on tracks 34 and 35 in the retrieval mode, the head drive means 32 positions the head assembly 22 so that the heads 24 and 28 are located above tracks 34 and 35 respectively. By moving the read/write heads 24, 26, 28, and 30 radially together to a particular selected cylinder and by selecting one of the four heads as will be described in greater detail, a particular track on any one of the four disk surfaces can be selected for recording or for playback.

The storage medium 11 also has a disk drive microprocessor 38, which by means of output 40, controls the head drive 32 and therefore selects the desired tracks by positioning read/write heads 24, 26, 28, and 30. The output signal on line 42 controls the speed of the motor 18. A sensor 44 is mounted adjacent the encoder disk 20 and senses the rotation of the spindle and provides that information to the microprocessor 38 by means of input line 46 so that the microprocessor 38, via output 42, can control the speed of the spindle as required.

The storage medium 11 including the disks 12 and 14, motor 18, encoder 20, head assembly 22, head drive 32, and the microprocessor 38 are preferably implemented by use of a La Pine Titan 20 Disk Drive available from La Pine Technology, Milpitas, Calif. Such a disk drive, is typically used in connection with providing additional storage for digital information for personal computers.

In addition to the disk drive 11, the retrieval and storage apparatus of the present invention comprises a record circuit 50, a playback circuit 52, and control means 80. The record circuit 50 receives a conventional composite video signal at its input 54, processes that signal, and transmits the processed video signal to head multiplexing circuit 56 via record output 58, isolation switch 60, and transmission line 62. The processed video signal on line 58 is an analog signal which is connected through the head multiplex circuit 56 to any one of the four output lines 64, 66, 68, and 70 which are connected respectively to read/write heads 24, 26, 28, and 30 for storing the analog signal onto one of the four selected tracks on one of the two disks.

Alternatively, in the retrieval mode, the information sensed by one of the four read/write heads 24, 26, 28, and 30 is connected via the head multiplex circuit 56 to the transmission line 62, through isolation switch 60, and to input 72 of the playback circuit 52. The playback circuit 52 receives the analog signal on line 72 and reconstitutes the composite video signal on its output 74 which is connected to monitor 76 and to auxiliary output 78. The record circuit 50 and playback circuit 52 will be described in greater detail below in connection with FIGS. 2 and 3.

The image storage and retrieval apparatus 10 is operated under the control of control means 80 which is a microprocessor. The microprocessor 80 receives commands from any appropriate input means such as keyboard 92 or an RS-232 computer port 94. The RS-232 port 94 refers to a standard port with defined pin connections, signal levels, and the like promulgated by the Electronics Industries Association of Washington, D.C., denoted as RS-232-C (Aug. 1969) and entitled "Interface Between Data Terminal Equipment and Data Communications Equipment Employing Serial Binary Data Interchange". The microprocessor also provides an indication on line 96 of the particular image being stored or retrieved which status is then displayed on display 98. The microprocessor 80 is preferably a Zilog Z-8 manufactured by Zilog, Inc. of Cupertino, Calif.

The microprocessor 80 by means of output 84 instructs the disk drive microprocessor 38 to move the head assembly 22 radially in or out, and the output on line 82 tells microprocessor 38 how far the head assembly 22 should be moved radially. Upon receipt of the direction and step instructions on lines 84 and 82, the microprocessor 38 instructs head drive 32 to move the head assembly 22 so that the read/write heads 24, 26, 28, and 30 are adjacent a particular selected cylinder and the four circular tracks on the disks that define that cylinder.

Once the microprocessor 80 has caused the microprocessor 38 to select a particular cylinder, the microprocessor 80 selects one of the read/write heads 24, 26, 28, or 30 by means of a multiplex instruction on line 86 which controls multiplex circuit 56 and causes multiplex circuit 56 to select one of its signal lines 64, 66, 68, and 70.

The microprocessor 80 also selects the storage mode or the retrieval mode for the apparatus 10. If the storage mode is selected, the microprocessor 80 first selects the track and head, and then in accordance with another aspect of the present invention, the microprocessor 80 via output line 102 activates erase circuit 100. The erase circuit 100 connects an erase signal to transmission line 62 via erase output 104 and then to the selected head of the disk drive via the multiplexer 56. While the erase sequence is enabled, the microprocessor also issues a command on output 108 to open isolation switch 60 which assures that the erase signal on line 104 is not connected back into the record circuit 50 or the playback circuit 52. The erase circuit is selected for predetermined amount of time to assure that the selected track has been appropriately erased and degaussed. The erase circuit will be described in greater detail below in connection with FIG. 4.

Once the erase sequence has ended, isolation switch 60 is closed, and the microprocessor 80 by means of output line 106 selects record circuit 50 and disables playback circuit 52. With the record circuit 50 enabled, the standard composite video signal on line 54 is processed and connected via lines 58 and 62 and multiplex circuit 56 to the selected read/write head.

Once the storage sequence has ended, and an instruction for retrieval has been received by the microprocessor 80, the microprocessor, after selecting the desired track and head, issues a command on line 106 to disable the record circuit 50 and to enable the playback circuit 52. The playback circuit 52 receives the recorded analog signal and reproduces the original composite video signal.

In operation the apparatus 10 comes up in the retrieval mode when turned on. An automatic initialization sequence in disk drive microprocessor 38 occurs which places the head stack assembly at tracks 000, the outermost track and gives an indication to microprocessor 80 of the 000 position on line 88. The main control microprocessor 80 then takes control of all aspects of the operation of the unit including updating the display 98 with the current image number and monitoring the keyboard 92 for operator input. If one desires to view or record a different image other than the one currently being viewed, the number is entered through keyboard, calculations are made within main control microprocessor 80, and the appropriate direction and step signals are sent to the processor 38 via lines 82 and 84 to move the head assembly 22 to the appropriate cylinder and tracks. In addition the microprocessor 80 selects the appropriate read/write head by means of control line 86 and multiplexer 56.

While other track and image notation schemes can be utilized by the apparatus depending on the particular application, the notation standard used for the present invention is one in which the outermost cylinder contain the lowest numbered tracks. Starting at the top surface 13 and the outside track, the surfaces are numbered #0, #1, #2, and #3 (top to bottom) on the first cylinder, cylinder #0. The first image, image #0, is therefore on the topmost surfaces 13 of disk 12. It is very simple to determine cylinder and surface number for any given video image. One simply divides the number of the desired image by 4 (the number of surfaces). The quotient is the number of the cylinder, and the remainder is the surface number. For example, to determine the location of image #1733, dividing 1733 by 4 gives a result of 433 with a remainder of 1. Therefore, image 1733 is located on cylinder #433, surface #1.

Referring to FIG. 2, there is shown a block diagram for the record circuit 50. The record circuit 50 includes a luminance/chroma separator circuit 120, a luminance FM modulator 122, a mixer 124, an enable switch 126, a heterodyne frequency converter 128, a reference oscillator 130, and a low pass filter 144.

A standard composite video signal is connected to input 54 of the record circuit 50. The composite video signal on input 54 is fed to luminance/chroma separator 120 where, using conventional separation techniques, the luminance signal is separated and made available on line 132, the chroma signal is separated and made available on line 134, and the video sync signal is separated and made available on line 136. The luminance signal on line 132 is fed to the luminance FM modulator 122 where it is modulated in conventional fashion, and the FM modulated luminance signal appears on line 138.

The chroma signal on line 134 is connected to heterodyne frequency converter 128 where the chroma signal is beat with a first reference frequency on input 140 from the reference oscillator 130. Particularly, the reference frequency is 4.268 MHz which, when heterodyned with the 3.58 MHz chroma signal on line 134, produces sum and difference frequencies on output line 142. The low pass filter 144 eliminates the high frequency produced by the sum of the reference frequency and the chroma signal and passes the low frequency difference signal to its output 146. The signal on output line 146 from the low pass filter has a frequency of approximately 688 KHz. The down-converted chroma signal on line 146 is then mixed with the FM modulated luminance signal on line 138 by mixer 124 to produce a composite processed analog video signal on line 148. If the apparatus 10 is in the storage mode, the microprocessor 80 produces an enable signal on line 106 which closes enable switch 126 to connect the processed analog video signal on line 148 to the output 58 of the record circuit 50. The processed analog video signal on line 58 is then connected through isolation switch 60, to transmission line 62, to multiplexer 56, and to the selected head.

Turning to FIG. 3, there is shown a block diagram of the playback circuit 52 which comprises a disable switch 150, a high pass filter 152, an amplifier clipper 154, a luminance FM demodulator 156, a delay line 158, a mixer 160, a low pass filter 162, an automatic gain control 164, a reference oscillator circuit 166, and a heterodyne frequency converter 186.

The playback circuit 52 receives the analog video signal from the head on input line 72. If the retrieval mode has been selected by the microprocessor 80, disable switch 150 is closed by a signal on line 106 from the microprocessor, and the analog video signal on line 72 is connected to line 170. The analog signal on line 170 has the same frequency composition as the signal produced by the record circuit on line 58. The analog video signal on line 170 is connected to the high pass filter 152 which separates the high frequency component, which is the luminance component, and connects the luminance component to line 172. The luminance component on line 172 is amplified, and the peaks are clipped in conventional fashion by amplifier clipper 154. The output on line 174 is connected to the luminance FM demodulator 156, and the luminance component of the original video signal is recovered on line 176. The luminance component is then delayed for a predetermined amount of time by a delay line 158, and the delayed luminance component appears at line 178 which is the input to mixer 160.

At the same time, the low pass filter 162 extracts the chroma component from the processed analog video signal on line 170 and feeds the chroma component to the automatic gain control circuit 164 via line 180. The automatic gain control adjusts the gain of the chroma component. The chroma component on line 182 at the output of the automatic gain control has a characteristic frequency of 688 kHz with disk jitter errors superimposed thereon. The chroma component on line 182 is connected to up-converter modulator 190 which sums the frequency of the chroma signal (688 kHz with jitter errors) with a reference frequency of 3.58 MHz on line 184, the output of oscillator 186. Oscillator 186 also produces a 3.58 MHz signal on its other output 188. The up-converter modulator 190 produces at its output 192 the sum of the frequency on line 184 (3.58 MHz) and the chroma signal on line 182 (688 kHz). The sum signal on line 192 has a frequency of 4.268 MHz and is connected to phase lock loop 194 where it is compared to the output of up-converter modulator 196 on line 198. The output of the phase lock loop on line 200 controls the voltage controlled oscillator 202 to a frequency of 688 kHz which appears at its output on line 204. The 688 kHz output on line 204 is up-converted by the 3.58 MHz reference frequency on line 188 by means of up-converter modulator 196. The resulting output on line 206 has a relatively stabilized frequency of 4.268 MHz which is connected to the frequency converter 168. The frequency converter 168 up-converts the chroma signal (688 kHz) by means of the reference frequency on line 206 (4.268 MHz) to a signal on line 208 having a frequency of 3.58 MHz. The up-converted chroma component on line 208 is connected to the mixer 160 where it is combined with delayed luminance component on line 178 to reproduce the standard video signal on line 74.

Turning to FIG. 4, there is shown a block diagram of the erase circuit 100. The erase circuit 100 includes a flip-flop 212, counter 214, and decreasing current switch 216. When the microprocessor 80 initiates an erase sequence, it enables the erase circuit 100 by means of an erase command on input 102 which sets flip-flop 212 producing a logic "1" on its Q output 218. The logic "1" on line 218 enables counter 214 which begins counting with each successive index pulse on line 210. The index pulses on line 210 are produced by the microprocessor 80 each time the microprocessor 38 for the disk drive determines that a single revolution of the disk has occurred. The index pulses are fed from microprocessor 38 to microprocessor 80 by means of line 90, and the index pulses on line 90 are then passed by microprocessor 80 to the erase circuit on line 210. The count 214 sequentially puts a logic "1" on each of its outputs 220, 222, 224, 226, 228, 230, and 232. With each logic "1" on outputs 220–232 the current switch 216 produces a reverse d.c. current on its output 104 which is connected through transmission line 62 and multiplexer 56 to the selected head. When the first line 220 is a logic "1", the reversing current switch 216 produces a high d.c. current on its output 104. With each successive logic "1" on lines 224, 226, 228, and 230, the reverse current switch produces lower and lower d.c. current levels at its output 104. Once the count has reached N with a logic "1" on line 230, the reverse current switch produces the lowest current, and with the next count, the counter 214 produces a logic "1" at its output 232 which resets flip-flop 212 and disables counter 214. Once the counter 214 has counted through its sequence from 1 to N and has been disabled, the erase sequence ends.

Alternatively, the reverse current switch 216 may be replaced by a high frequency oscillator which produces a 12 MHz to 16 MHz output at line 104. The oscillator is enabled until the counter 214 has counted to N+1. The erase sequence assures that the track is totally erased of a prior image and appropriately degaussed so that storage on that track will not be affected by residual effects of the previous image.

Another important aspect of the present invention is the ability to compensate for time base errors in the storage and retrieval of images that result from the inevitable jitter in the speed of the spinning magnetic disks. Particularly, with reference to FIG. 5, there is shown a servo-control circuit 250 comprising a phase lock loop 252 and a voltage controlled oscillator 254. In accordance with conventional practice, the microprocessor 38 of the disk drive 11a has stable oscillator which provides a timing reference for the microprocessor to use in controlling the speed of the spindle 16. The microprocessor 38 sends a control signal on line 42 to motor amplifier 258 which in turn controls the speed of the motor 18. The speed of the spindle 16 is sensed by means of the encoder 20 and sensor 44, and the encoder signal is connected back via line 46 to the microprocessor 38 to provide adjustment of the speed of the motor accordingly.

In accordance with the present invention, line 46 is connected to the phase lock loop 252 through microprocessor 38 and microprocessor 80. The phase lock loop also receives the video sync signal on line 256 from the record circuit 50. The phase lock loop compares the speed of the motor represented by the encoder signal on line 46 to the video sync signal on line 256 and produces a difference signal on line 260. The difference signal on line 260 then serves to control the voltage controlled oscillator 254 which produces a timing reference on its output 262. The voltage controlled oscillator 254 thereby replaces the stable oscillator previously described which provided the timing to the microprocessor 38. Consequently, the servo-control circuit 250 controls the speed of the motor 18 in synchronization with the video sync signal. While the servo-control circuit 250 cannot eliminate jitter from the speed of the disks, it does assure that, in a gross sense at least, the disks are rotating once for each complete video image.

Turning to FIG. 6, and in connection with another important aspect of the present invention, there is shown a reference frequency circuit 270 which comprises the encoder 20, its sensor 44, and a frequency converter 272. FIG. 6 also shows the record circuit 50 which receives the composite video signal at its input 54 and produces the processed analog video signal at its output 58 as previously described. The processed analog video signal at output 58 is connected through isolation switch 60 and multiplexer 56 to one of the four heads 24, 26, 28, and 30. The reference frequency circuit 270 senses the speed of the spindle 16 by means of encoder 20 and sensor 44. The encoder signal on line 46, which is proportional in frequency to the speed of the spindle, is connected to the frequency converter 272 (as well as to the microprocessor 38) where it is converted to a reference frequency of 4.268 MHz on line 274 for the nominal rotational speed of the disks. The reference frequency on line 274 varies in frequency in accordance with the variations in the speed of the spindle 16. Therefore, when the reference frequency on line 274 is connected to heterodyne frequency converter 128 of the record circuit 50, the resulting frequencies from the heterodyne frequency converter 128 and therefore from the mixer 124 vary in accordance with the variations in the speed of the disk. Consequently, the frequency of the signal on line 58 at the output of the record circuit is time base compensated when it is recorded onto the disk. It should be appreciated that the reference signal could also be produced by providing a prerecorded reference signal on the magnetic disk and that the term encoder as used herein refers to both a separate encoder such as 20 and the disk itself with a reference frequency recorded thereon.

Figure 7:
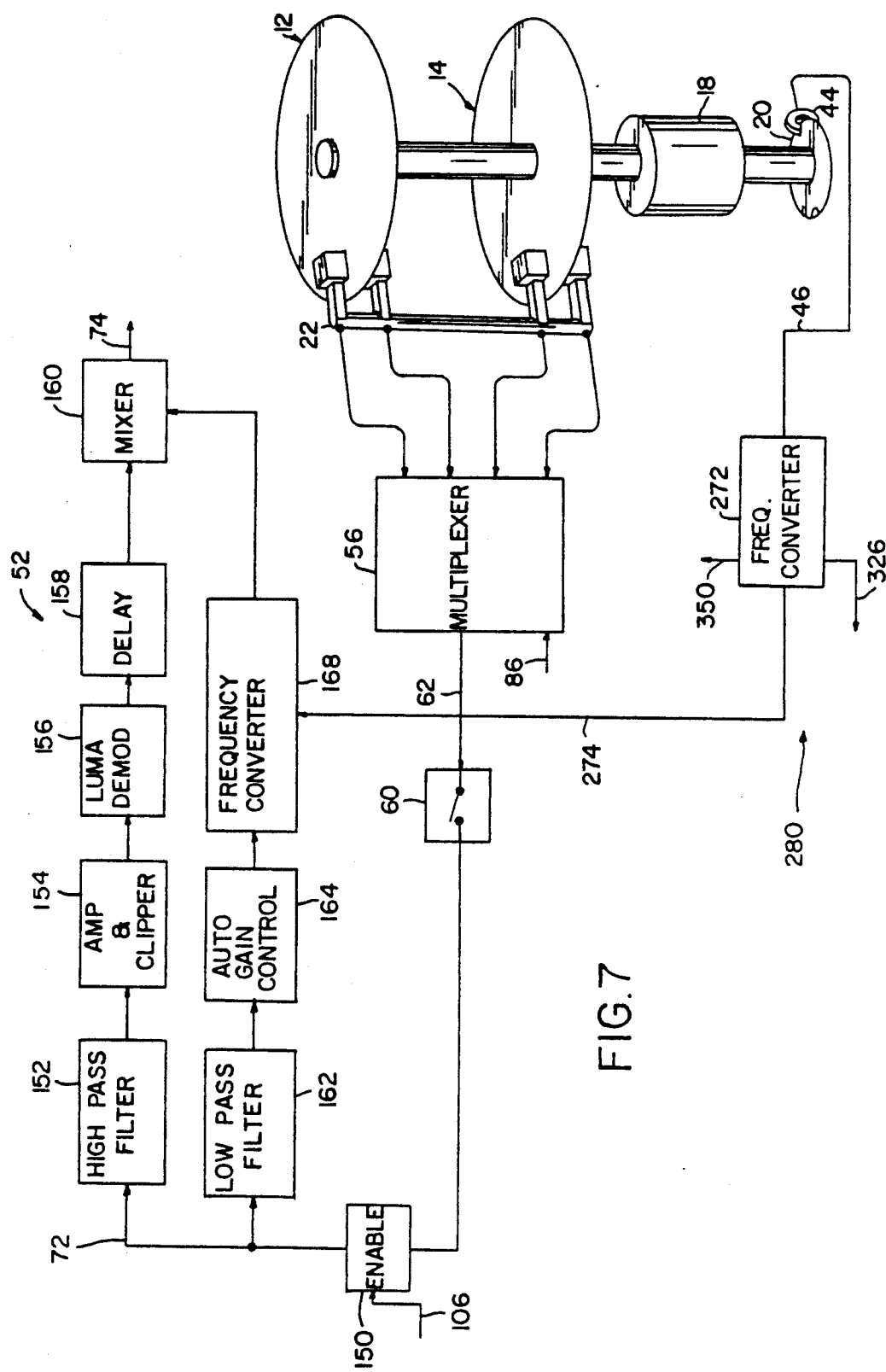
FIG. 7 is a block diagram showing one means of time base compensation during the retrieval mode.

In connection with retrieval of the analog video signal from the disk and with reference to FIG. 7, there is provided a reference frequency circuit 280 comprising the same elements as the reference frequency circuit 270. During retrieval, the 4,268 MHz signal at the output 274 of the frequency converter 272 is connected to the frequency converter 168 of the playback circuit 52. Consequently, if jitter results in the speed of the disks during retrieval, that jitter also appears in the frequency on line 274 so that when the chroma component is being up-converted, the jitter at the input 72 to the playback circuit 52 is compensated by an offsetting jitter in the frequency on line at 274. Consequently, the reference frequency circuits 270 and 280 together provide complete time base compensation for the video signals both during storage and retrieval.

In accordance with another aspect of the present invention, it is possible to provide time base compensation both in connection with the frequency conversion of the chroma signal or at an earlier stage in connection with generating the 3.58 MHz chroma signal. In that connection and with reference to FIG. 8, there is shown a signal processor 300 which includes a matrix circuit 302, a red-minus-luminance modulator 304, a blue-minus-luminance modulator 306, a phase shift circuit 308, and a combining amplifier 310. The outputs 132 and 134 of the signal processor 300 are connected to the record circuit 50 at lines 132 and 134 as shown in FIG. 2. Consequently, in the modified version of the record circuit 50 including the signal processor 300, the Y/C separator 120 may be eliminated. Otherwise, the luminance signal on line 132 and the chroma signal on line 134 are processed for recording in the same fashion as previously described in connection with record circuit 50.

In connection with the signal processor 300, an image 312 is recorded by a video camera 314 in conventional fashion to produce a red signal on line 316, a green signal on line 318, and blue signal on line 320. The camera 314 also has an oscillator which produces a sync signal on line 136. The red, green, and blue signals are connected to matrix circuit 302 which produces a luminance signal on line 132, a red-minus-luminance signal on line 322, and a blue-minus-luminance signal on line 324. The color components on lines 322 and 324 are modulated with a 3.58 MHz reference signal on line 326. The 3.58 MHz signal on line 326 is derived from the frequency converter 272 shown in FIGS. 6 and 7 and varies in accordance with any variation in the speed of the disk drive. The 3.58 MHz reference signal on line 326 is connected to red-minus-luminance modulator 304 and to blue-minus-luminance modulator 306 through 90° phase shift circuit 308. The output 328 and 330 of the red-minus-luminance modulator 304 and the blue-minus-luminance modulator 306 respectively are connected to combining amplifier 310 which combines the two color components into the 3.58 MHz chroma signal on line 134.

Because the reference signal on line 326 varies in accordance with the jitter of the disk drive, the chroma signal is compensated at the time it is modulated to 3.58 MHz and again when it is down-converted to 688 kHz in the converter 128 (FIG. 2). It should also be appreciated that the luminance signal on line 132 and the chroma signal on line 134 could be recorded on two separate tracks on the disks for later separate retrieval and processing.

Figure 9:
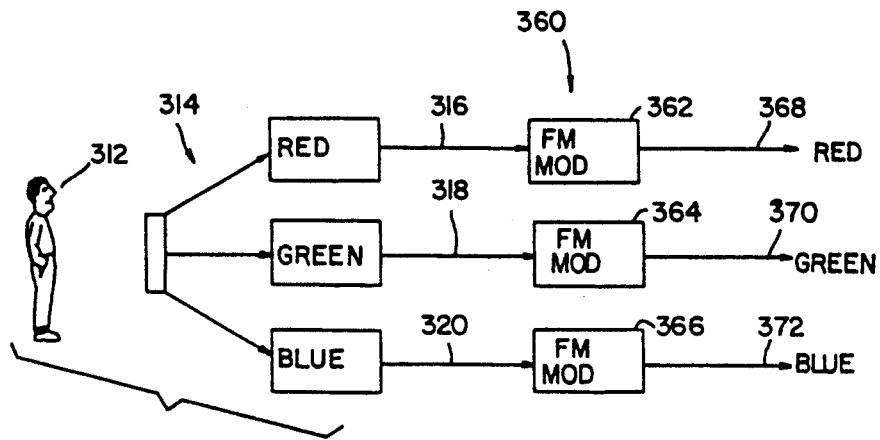
FIG. 9 is a block diagram showing a modified record circuit.

In accordance with another aspect of the present invention, it may be desirable in connection with providing very high quality color pictures to record the red signal, green signal, and blue signal each on a separate track on the magnetic disks. With reference to FIG. 9, the record circuit 50 of FIG. 2 is replaced by a modified record circuit 360 which includes FM modulators 362, 364, and 366 with outputs 368, 370, and 372 respectively. The video camera 314 generates separate red signal 316, green signals 318, and blue signal 320. Each signal is separately FM modulated by modulators 362, 364, and 366 which are conventional in nature. The outputs of the FM modulators are connected directly to recording heads 24, 26, and 28, respectively, through appropriate isolation switches such as 60. Consequently, each of the recording heads 24, 26 and 28 separately records the red, green, or blue signal on three separate tracks of the disks.

Figure 10:
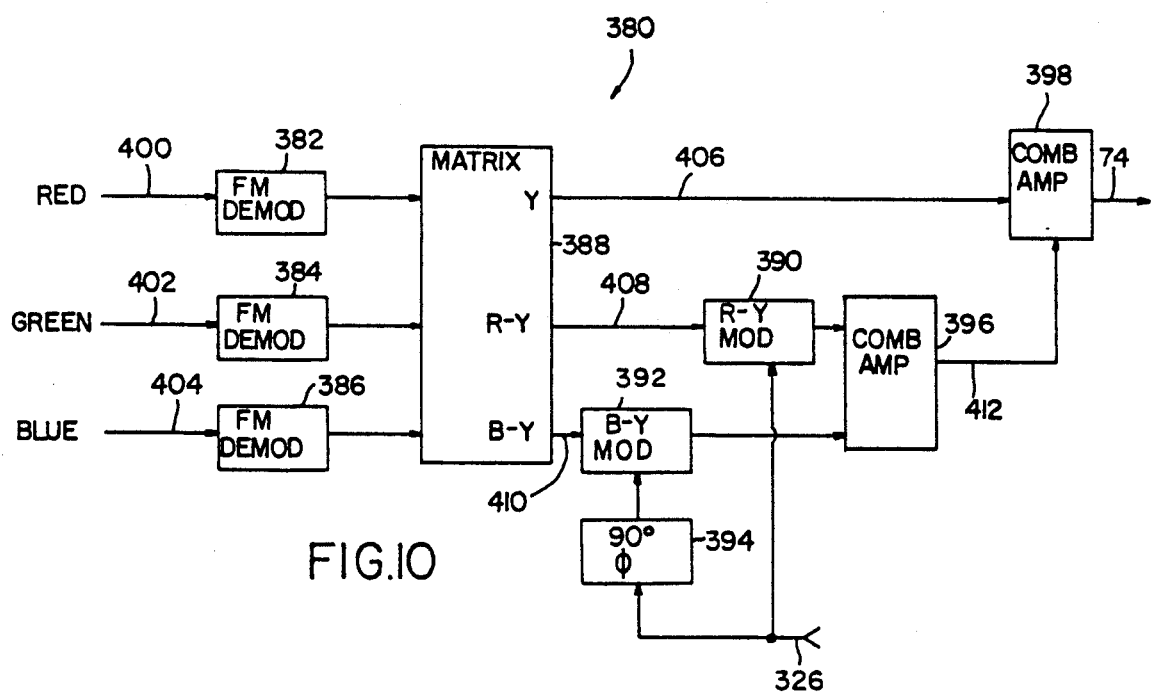
FIG. 10 is a block diagram showing a modified playback circuit.

With the modified record circuit 360 shown in FIG. 9, it is necessary upon retrieval to modify the playback circuit to receive and process the individual recorded three color components. Turning to FIG. 10, there is shown an alternative playback circuit 380 which can be used where each color component, red, green, and blue, is recorded on an individual track. The playback circuit 380 comprises FM demodulators 382, 384, and 386, matrix circuit 388, red-minus-luminance modulator 390, blue-minus-luminance modulator 392, phase shift circuit 394, combining amplifier 396, and combining amplifier 398.

During retrieval, the analog signal from heads 24, 26, and 28 are received on input line 400 for red, 402 for green, and 404 for blue. The color component signals are demodulated by FM demodulators 382, 384, and 386, and the demodulated signals are connected to the matrix circuit 388. The matrix circuit 399 arithmetically combines the demodulated color components to produce a luminance signal on line 406, and red-minus-luminance signals on line 408, and a blue-minus-luminance signal on line 410. The two color component signal on line 408 and 410 are modulated by modulators 390 and 392 to the frequency of 3.58 MHz with each modulated color component being 90° out of phase from the other. The resulting modulated color components are combined by combining amplifier 396 to produce a single chroma signal on line 412. The chroma signal on line 412 and the luminance signal on line 406 are then combined by combining amplifier 398 to produce a standard composite video signal on line 74 which is then, with reference to FIG. 1, connected to monitor 76 and to auxiliary output 78.

Figure 11:
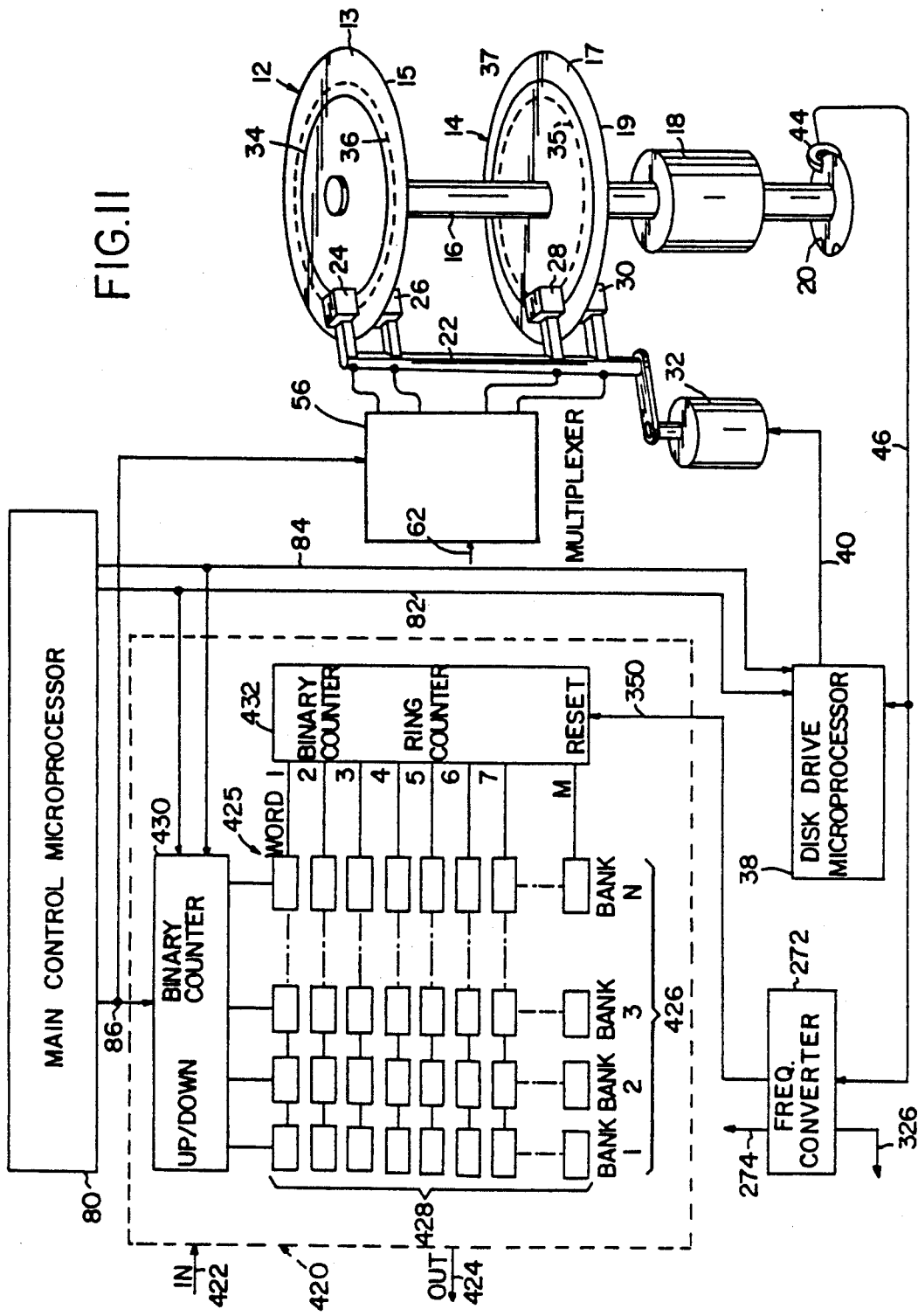
FIG. 11 is a block diagram showing an addressable digital auxiliary memory which "walks along" with the storage disk.

In accordance with another aspect of the present invention, it may upon occasion be desirable to record certain information digitally concerning the nature of the image such as time, date, lens setting, or other pertinent information at the time the image is recorded on the disk. In that regard and with reference to FIG. 11, there is shown an auxiliary digital memory 420 having a memory array 425, which is divided into N number of memory banks 426 with each bank having M number of words 428. The banks are selected by a binary counter 430, and the words are selected by a binary counter 432. The auxiliary memory 420 has a data input 422, a data output 424, a clock input 350, and address lines 82, 84, and 86. The auxiliary memory 420 is addressed by the microprocessor 80 so that each bank corresponds to a single circular track on the disks. The signals on line 82 and 84 by means of a binary counter 430 select a group of four banks corresponding to the radial position of the head assembly 22, and the signal on line 86 selects a bank within the selected group which corresponds to one of the four heads which has been selected for storage or retrieval.

As the disks rotate, the encoder 20, the sensor 44, and the frequency converter 272 produce a synchronized clock on line 350. The clock on line 350 controls the binary counter 432 which continuously counts from 1 to M number of words in each bank. Consequently, with the banks selected by the address from the processor 80, the auxiliary memory 420 cycles from word 1 to word M and repeats in synchronization with the disk making one full revolution. Therefore, it can be said that the words in each memory bank "walk along" with the information on the disks.

Figure 12:
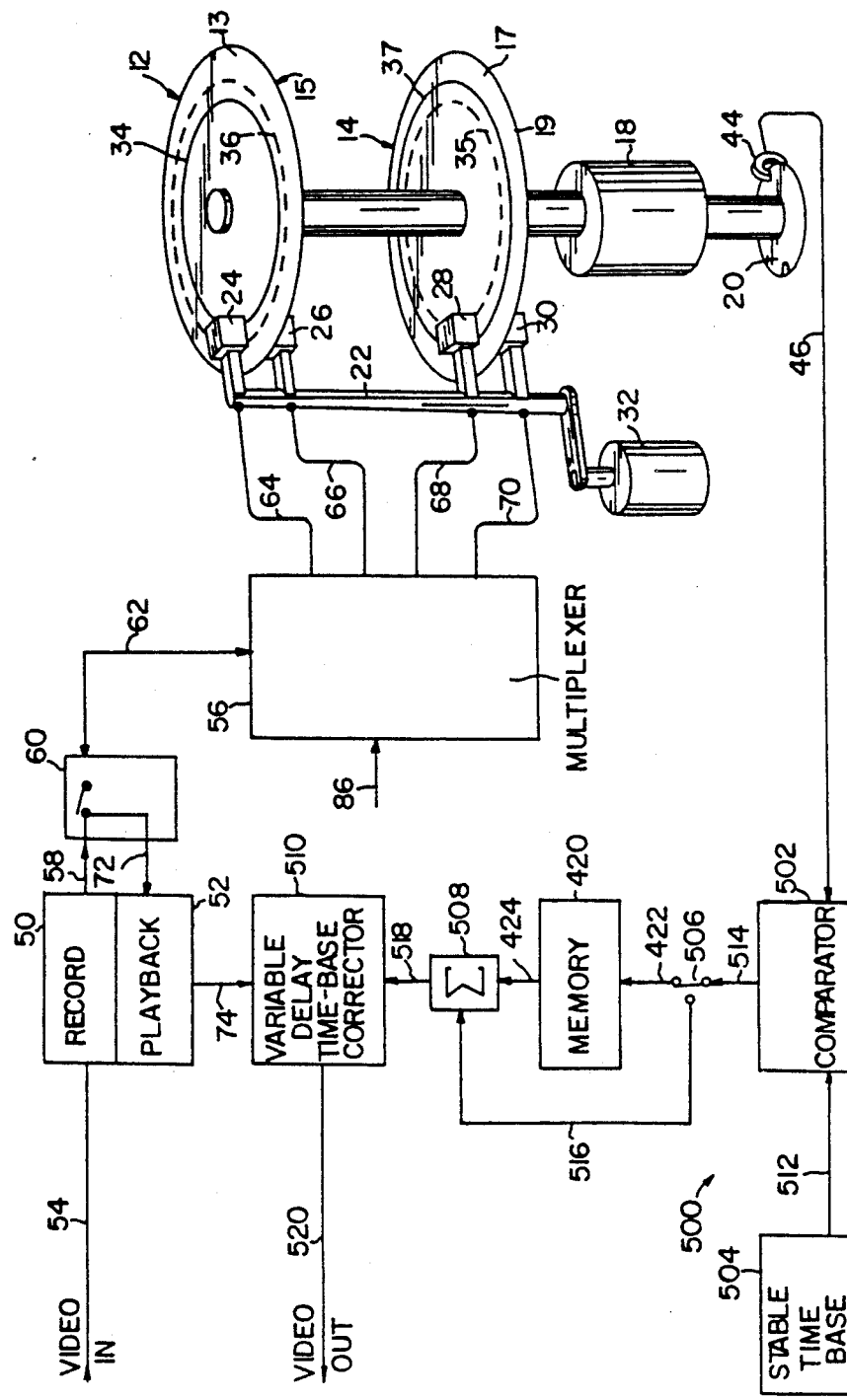
FIG. 12 is a block diagram showing one means of using the auxiliary memory to provide time base correction during the retrieval mode.

One particularly advantageous purpose of the auxiliary memory 420 is to store time base errors which occur during storage of the images on the disks. Turning to FIG. 12, there is shown a scheme for using the auxiliary memory 420 for that purpose. A time base correction circuit 500 comprises a comparator 502, a stable time base oscillator 504, a switch 506, summing circuit 508, and time base corrector 510. Particularly, the comparator receives at its input 46 the signal from the encoder 20 and sensor 44 and receives the output of the stable oscillator 405 at input 512. The comparator produces a digital error signal on line 514 which is proportional to the variation between the speed of the spindle 16 (line 46) and the frequency of the stable time base oscillator 504 (line 512).

During the storage mode, switch 506 is connected to input 422 of the auxiliary memory 420, and the digitized error signal on line 514 relating to the jitter is stored in the memory 420 as the disk makes on one revolution. Upon completion of the storage mode, switch 506 is toggled to line 516, and the auxiliary memory 420 begins reading out the digitized error information onto its output 424. During the retrieval mode, the comparator continues to produce digital time base error information on line 514 (and therefore line 516) which is summed with the time base error information from the auxiliary memory 420 by summing circuit 508. By comparing the time base error information stored in auxiliary memory 420 during the storage mode to the time base error information produced during the retrieval mode, a time base correction signal is produced by the summing circuit 508 on line 518. The time base correction signal on line 518 is connected to the time base corrector circuit input 510 where it controls the delay of the signal on output 74 of the playback circuit 52 to produce a time base corrector video output signal on line 520.

Figure 13:
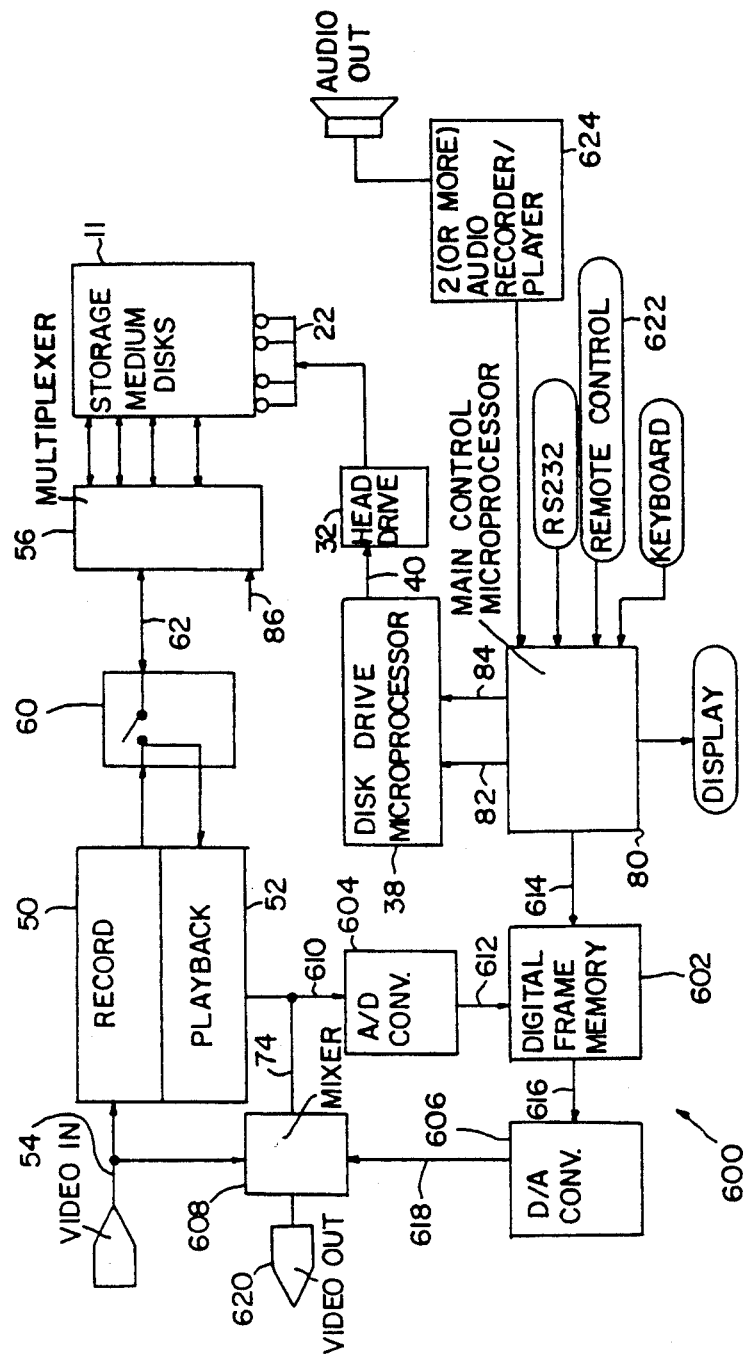
FIG. 13 is a block diagram showing a digital single image digital memory for mixing two images during the retrieval mode.

Further in accordance with the present invention and with reference to FIG. 13, there is provided a single frame memory circuit 600 which cooperates with the storage and retrieval apparatus of the present invention to allow for transition between images during playback such as dissolving, overlay, fade, and other special effects. Particularly, the frame memory circuit comprises a digital memory 602, analog-to-digital (A/D) converter 604, digital-to-analog converter (D/A) 606, and mixer 608. In order to provide the special effects of the frame memory 600, the processor 80 first instructs the frame memory 602 via line 614 to store the image that is being retrieved during the retrieval mode. That is accomplished by feeding the video signal on line 74 from the playback circuit 52 to the A/D converter 604 via input 610. The A/D converter 604 digitizes the video signal form the playback circuit and feeds the digitized image to the frame memory 602 via line 612. Once the digital image has been stored in frame memory 602, the main processor 80 calls for the next image to be retrieved from the storage medium 11 as has been previously described. At the same time, the microprocessor 80 commands the frame memory 602 via line 614 to output the stored image in digital form onto its output 616. The image represented by the signal on line 616 is converted from digital to analog by D/A converter 606, and an analog video signal results on line 618. The playback circuit 52 produces a composite video signal on its output 74. The signal on line 618 represents the first image, and the signal on line 74 presents the next image. The two images then, in accordance with conventional mixing techniques carried out by a mixer circuit 608, can be dissolved, overlaid, faded one to the other, or merged to provide a composite output on line 620.

The present invention may also include additional features which enhance its usefulness. For example, the microprocessor 80 may be controlled by a remote control 622 much in the fashion of the remote control of a conventional slide projector. The microprocessor may also select images under the control of a audio tape device 624 which can provide a time sequence of image retrieval all in relationship to the audio being presented.

I claim:

1. A process for storing a plurality of still images comprising the steps of:
   receiving a video signal representing one of said still images, including a sync signal, a luminance component and a chrome component;
   separating the components;
   frequency converting the chrome component by a first preselected reference to frequency;
   frequency modulating the luminance component;
   recombining the components to produce an analog signal;
   transmitting said analog signal to a read/write head for recording the analog signal on a storage disk;
   selecting a circular track of said disk for storage of the combined components;
   separating the luminance component from the chroma component;
   frequency demodulating and delaying the luminance component;
   frequency converting the chroma component by a second preselected frequency;
   recombining the components to form combined components; and
   introducing the combined components as a video signal for display upon a video display device as a still image.

* * * * *